United States Patent [19]

Kihara et al.

[11] Patent Number: 4,622,581
[45] Date of Patent: Nov. 11, 1986

[54] VIDEO CAMERA CONTROL CIRCUIT AVERAGING CONTROL SIGNALS EACH OBTAINED BY ADDING OR SUBTRACTING A PREVIOUS CONTROL SIGNAL AND REFERENCE CORRECTING DATA IN RESPONSE TO ERROR DATA, WITH THE REFERENCE CORRECTING DATA BEING REDUCED FOR EACH POLARITY REVERSAL

[75] Inventors: Taku Kihara; Takashi Nakamura, both of Kanagawa, Japan

[73] Assignee: Sony Corporation, Tokyo, Japan

[21] Appl. No.: 652,084

[22] Filed: Sep. 19, 1984

[30] Foreign Application Priority Data

Sep. 22, 1983 [JP] Japan ............................. 58-175427

[51] Int. Cl.⁴ ........................................... H04N 9/093
[52] U.S. Cl. ...................................................... 358/51
[58] Field of Search .................................. 358/29, 51

[56] References Cited

U.S. PATENT DOCUMENTS

4,318,124 3/1982 Nakamura et al. ................... 358/51
4,335,397 6/1982 Tamura .................................. 358/29
4,381,520 4/1983 Machida et al. ...................... 358/29
4,503,456 3/1985 Nakamura et al. ................... 358/51

Primary Examiner—John W. Shepperd
Attorney, Agent, or Firm—Lewis H. Eslinger; Alvin Sinderbrand

[57] ABSTRACT

An automatic control circuit for a video camera includes an error detecting circuit for detecting and generating error data, a control signal generator supplied with the error data and generating a control signal, and a control circuit supplied with the control signal for controlling a controlled circuit for the video camera; wherein said control signal generator mixes reference correcting data generated from the error data with the control signal thereby to generate a new control signal, and the control signal generator includes a circuit for changing the polarity of the reference correcting data and decreasing the absolute value of the reference correcting data when the error data changes its polarity and a circuit for averaging the plural control signals each of which is generated when the reference correcting data is at its minimum value and the error data changes its polarity, the output of the averaging circuit being the control signal.

5 Claims, 17 Drawing Figures

VIDEO CAMERA CONTROL CIRCUIT AVERAGING CONTROL SIGNALS EACH OBTAINED BY ADDING OR SUBTRACTING A PREVIOUS CONTROL SIGNAL AND REFERENCE CORRECTING DATA IN RESPONSE TO ERROR DATA, WITH THE REFERENCE CORRECTING DATA BEING REDUCED FOR EACH POLARITY REVERSAL

BACKGROUND OF THE INVENTION

1. Field of the Invention

The present invention generally relates to automatic control circuits and more particularly to an automatic control circuit for a video camera capable of automatically carrying out the centering adjustment (adjustment of the center position of a picture image) of the horizontal and vertical deflections and the adjustment of white balance.

2. Description of the Prior Art

Figure 1:
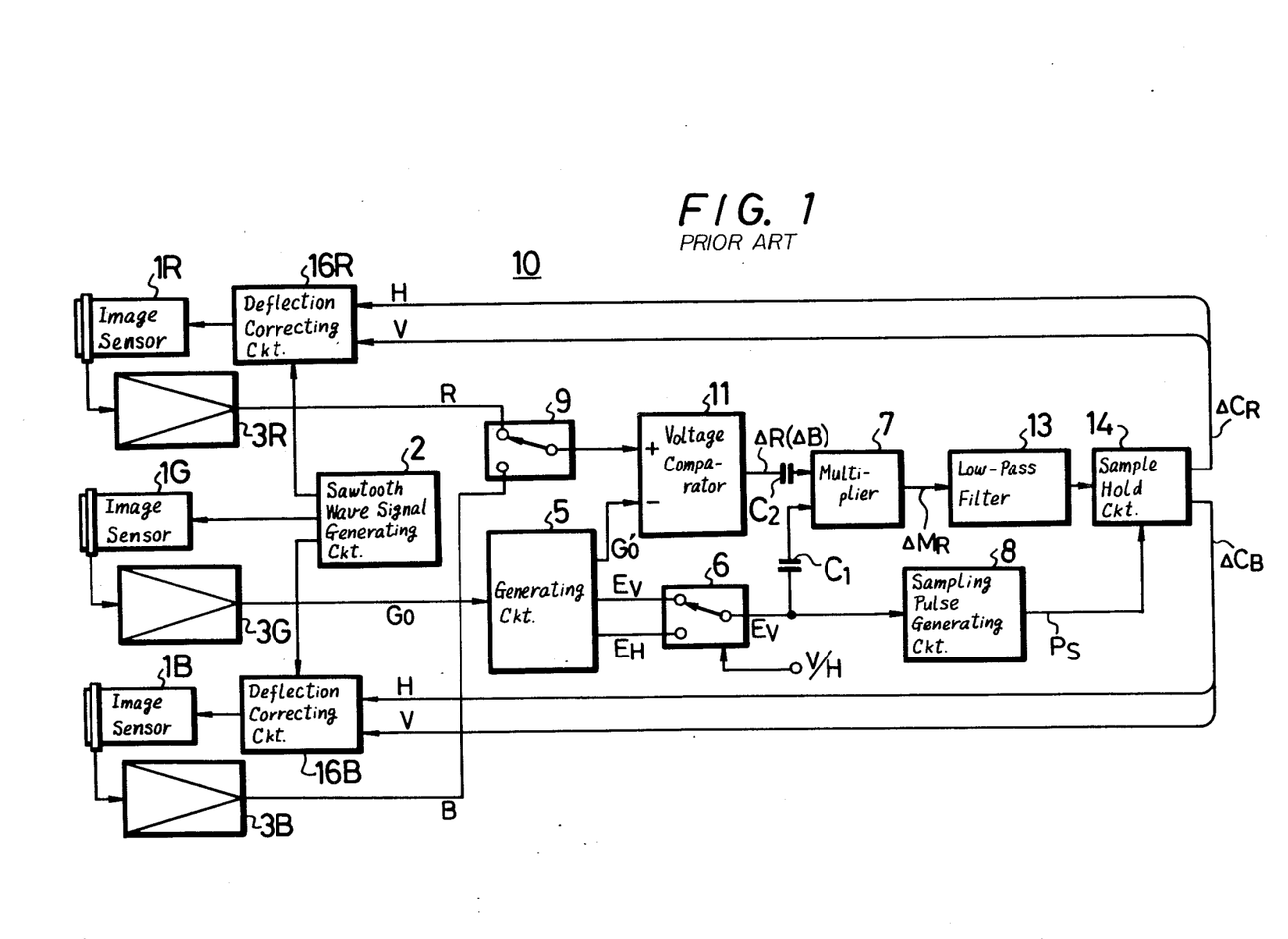
FIG. 1 is a block diagram showing an example of a prior art centering control system.

In a video camera, for example, of the three-tube type, an automatic control circuit 10 as shown in FIG. 1 is used to automatically adjust the deflection centers thereof.

Figures 2A, 2B:
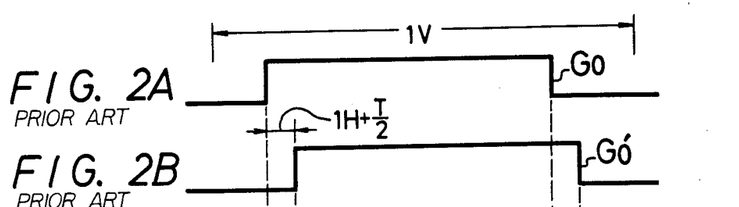
FIGS. 2A to 2H are respectively waveform diagrams useful for explaining the operation thereof.

In FIG. 1, reference numerals 1R, 1G, and 1B respectively designate pick-up tubes or image sensors for red, green and blue colors. In this example, under the condition that the deflection center of the green image sensor 1G is taken as a reference, the vertical and horizontal centerings of red and blue image sensors 1R and 1B are adjusted. To this end, a deflection signal useful for the horizontal and vertical deflections is supplied from a sawtooth wave signal generating circuit 2 to the green image sensor 1G and has added thereto biases corresponding to 1H (H represents the horizontal period) in the vertical direction of the picture screen and T/2 (T<<H is satisfied) in the horizontal direction so that the green image sensor 1G produces a green signal Go (see FIG. 2A) which is advanced in phase by (1H+) relative to red and blue signals R and B produced from red and green image sensors 1R and 1B.

Figure 2C:
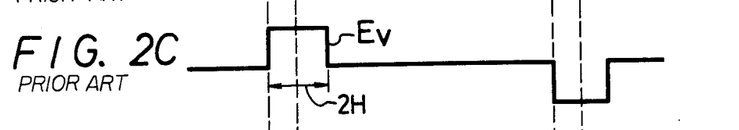

The green signal Go is supplied through a preamplifier 3G to a generating circuit 5 which generates a comparing reference signal G'o and edge signals $E_V$ and $E_H$. The reference signal G'o (see FIG. 2B) is delayed in phase by (1H+(T/2)) relative to the green signal Go and approximately in equiphase with the red and blue signals R and B. The edge signal $E_V$ is the edge signal in the vertical direction and is used to adjust the vertical centering. This edge signal $E_V$ is formed of the green signal Go and a signal which results from delaying the green signal Go by 2H. Accordingly, the edge signal $E_V$ is a signal which has the pulse width and the polarity as shown in FIG. 2C. The other edge signal $E_H$ is used to adjust the horizontal centering.

If the vertical centering is adjusted first, one edge signal $E_V$ is first selected by a switching circuit 6 to which the edge signals $E_V$ and $E_H$ are applied and then supplied through a capacitor $C_1$ for DC cutting to a multiplier 7. The edge signal $E_V$ is further supplied to a generating circuit 8 which generates a sampling pulse $P_S$ (see FIG. 2G).

Figure 2D:
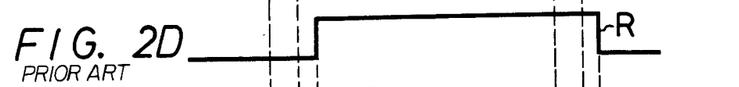
Figure 2E:
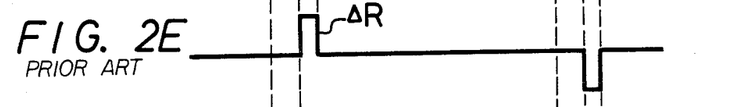
Figures 2F, 2G, 2H:
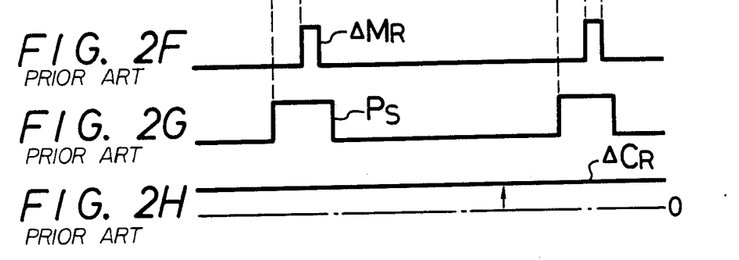

On the other hand, the red and blue signals R and B are respectively supplied through preamplifiers 3R and 3B to a switching circuit 9. Then, the selected one of the primary color signals R and B and the reference signal G'o are both supplied to a voltage comparator 11 which detects error signals $\Delta R$ and $\Delta B$ corresponding to positional displacements of the red and blue signals R and B relative to the reference signal G'o. FIGS. 2D and 2E show examples of the red signal R and its error signal $\Delta R$ relative to the reference signal G'o. The error signal $\Delta R$ will be described hereinafter.

The error signal $\Delta R$ is supplied through a capacitor $C_2$ for DC cutting to the multiplier 7 in which it is multiplied with the edge signal $E_V$. As a result, a multiplied output $\Delta M_R$ (see FIG. 2F) is produced with its pulse width corresponding to the displacement amount of the center position of the picture image and its polarity corresponding to the direction of displacement. The multiplied output $\Delta M_R$ is smoothed by a low-pass filter 13 and sampled and then held by a sample hold circuit 14 to which the sampling pulse $P_S$ is applied. The held output $\Delta C_R$ (see FIG. 2H) is supplied to a deflection correcting circuit 16R in which a vertical deflection signal applied thereto from the generator 2 is corrected and then supplied to red image sensor 1R.

Regarding the blue image sensor 1B, a held output $\Delta C_B$ corresponding to the error signal $\Delta B$ is similarly generated and supplied to a deflection correcting circuit 16B by which a vertical deflection signal applied thereto from the generator 2 is corrected and then supplied to the blue image sensor 1B.

The horizontal centering is adjusted after the vertical centering is adjusted. At that time, the edge signal $E_H$ is selected by the switching circuit 6.

Figure 3:
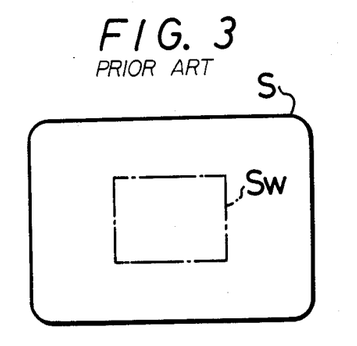
FIG. 3 is a diagram useful for explaining the formation of edge signals used in the prior art centering control system shown in FIG. 1.

By the way, the edge signals $E_V$ and $E_H$ are formed on the basis of an object existing within a predetermined window area $S_W$ including the center of a picture screen S as shown in FIG. 3. Since the sampling pulse $P_S$ is formed on the basis of the edge signals $E_V$ and $E_H$, if an object containing much edge components and an object containing less edge components are displaced the same distance from the deflection center, the number of samplings is different in each case and so the held outputs $\Delta C$ ($\Delta C_R$ or $\Delta C_B$) are naturally different in value.

Figure 4:
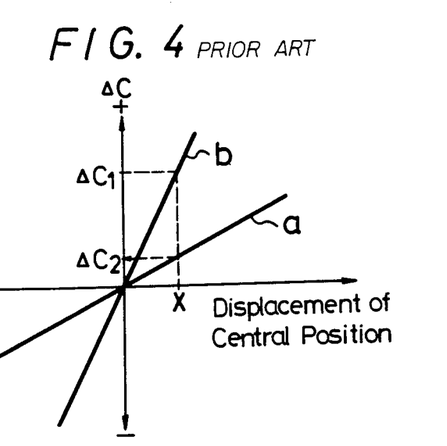
FIG. 4 is a graph indicating a relation between a centering diaplacement and a held output so as to explain the operation of the prior art centering control system shown in FIG. 1.

For example, when the centering is adjusted by using the object containing less edge components, if a relation between the displacement of the centering and the held outputs $\Delta C_R$, $\Delta C_B$ is given as shown by a straight line a in FIG. 4, such relation for the object containing much edge components becomes as shown by a straight line b in FIG. 4. Accordingly, although the displacement of the centering is indicated as X in FIG. 4, depending on the objects to be used, the held output $\Delta C$ becomes considerably different for example, as indicated at $\Delta C_1$ and $\Delta C_2$. In that case, if the centering is adjusted correctly by using the held output $\Delta C_1$, if the object containing less edge components is used, the deflection correcting amount becomes significantly insufficient so that the horizontal and vertical centering can not be adjusted correctly.

When the white balance is adjusted, the automatic control circuit 10 as shown in FIG. 1 is used to control the gains of gain control circuits (not shown) provided at the rear stages of the preamplifiers 3R and 3B. Also at that time, the object existing within the predetermined window area $S_W$ of the picture screen S is used and the level of the chrominance signal is sampled and held and the output thereof is used to carry out the balance adjustment. Therefore, under different pick-up or shooting conditions, the correcting signal for adjusting the white balance becomes sometimes different. In consequence, so long as the control system having the circuit arrangement as shown in FIG. 1 is used, a similar defect to that in the centering adjustment operation takes place.

OBJECTS AND SUMMARY OF THE INVENTION

Accordingly, it is an object of this invention to provide an improved automatic control circuit for a video camera capable of obviating the shortcomings inherent in the prior art circuit.

It is another object of this invention to provide an automatic control circuit for a video camera in which under different shooting conditions, an aspect of a controlled system to be corrected can always be converged to a predetermined value.

It is a further object of this invention to provide an automatic control circuit for a video camera capable of automatically carrying out the centering adjustment of the horizontal and vertical deflections and the adjustment of white balance.

It is yet a further object of this invention to provide an automatic control circuit for a video camera which can increase accuracy in the automatic control operation considerably.

It is a still further object of this invention to provide an automatic control circuit suitable for use with a three-tube type video camera.

According to one aspect of this invention, there is provided an automatic control circuit for a video camera comprising:

(A) an error detecting circuit for detecting and generating an error data;

(B) a control signal generator supplied with said error data and for generating a control signal; and (C) a control circuit supplied with said control signal and for controlling a controlled circuit in said video camera, wherein said control signal generator mixes a reference correcting data generated from said error data to said control signal thereby to generate a new control signal, and said control signal generator includes means for changing the polarity of said reference correcting data and decreasing the absolute value of said reference correcting data when said error data changes its polarity and means for averaging the plural control signals each of which is generated when said reference correcting data is at its minimum value and said error data changes its polarity, the output of said averaging means being the control signal.

The other objects, features and advantages of the present invention will become apparent from the following description taken in conjunction with the accompanying drawings through which the like references designate the same elements and parts.

DESCRIPTION OF THE PREFERRED EMBODIMENT

Now, an embodiment of an automatic control circuit for a video camera according to the present invention will hereinafter be described in detail with reference to FIG. 5, in which the present invention is applied to the above control system for the centering adjustment.

In the figures, like parts corresponding to those in FIG. 1 are marked with the same references and will not be further described. When the positional displacements of the red and blue signals R and B in the vertical and horizontal directions relative to the green signal Go are detected by the voltage comparator 11, in accordance with this embodiment, the level comparison of $(G'o-G'o)$ is first carried out in the voltage comparator 11 and other compared outputs $(R-G'o)=\Delta R$ and $(B-G'o)=\Delta B$ are respectively controlled to be converged to the level compared output $\Delta G_V$.

The reason why the level compared output $\Delta G_V$ is selected as a converging reference value is that a correct converging reference value must be obtained at all times regardless of the gain and the temperature drift of the automatic control loop. If an absolute converging reference value is used, it may be possible that, even if the positional displacement is same, the temperature drift and the like, if any, cause the values $\Delta R$ and $\Delta B$ to be changed and hence the deflection center can not be adjusted completly. If the level compared output $\Delta G_V$ is used, the level compared output $\Delta G_V$ itself is affected in advance by the temperature drift and is therefore the described possibility for error cannot occur.

For this reason, the reference signal G'o is supplied to switching circuit 9 in addition to the red and blue signals R and B.

Figure 5:
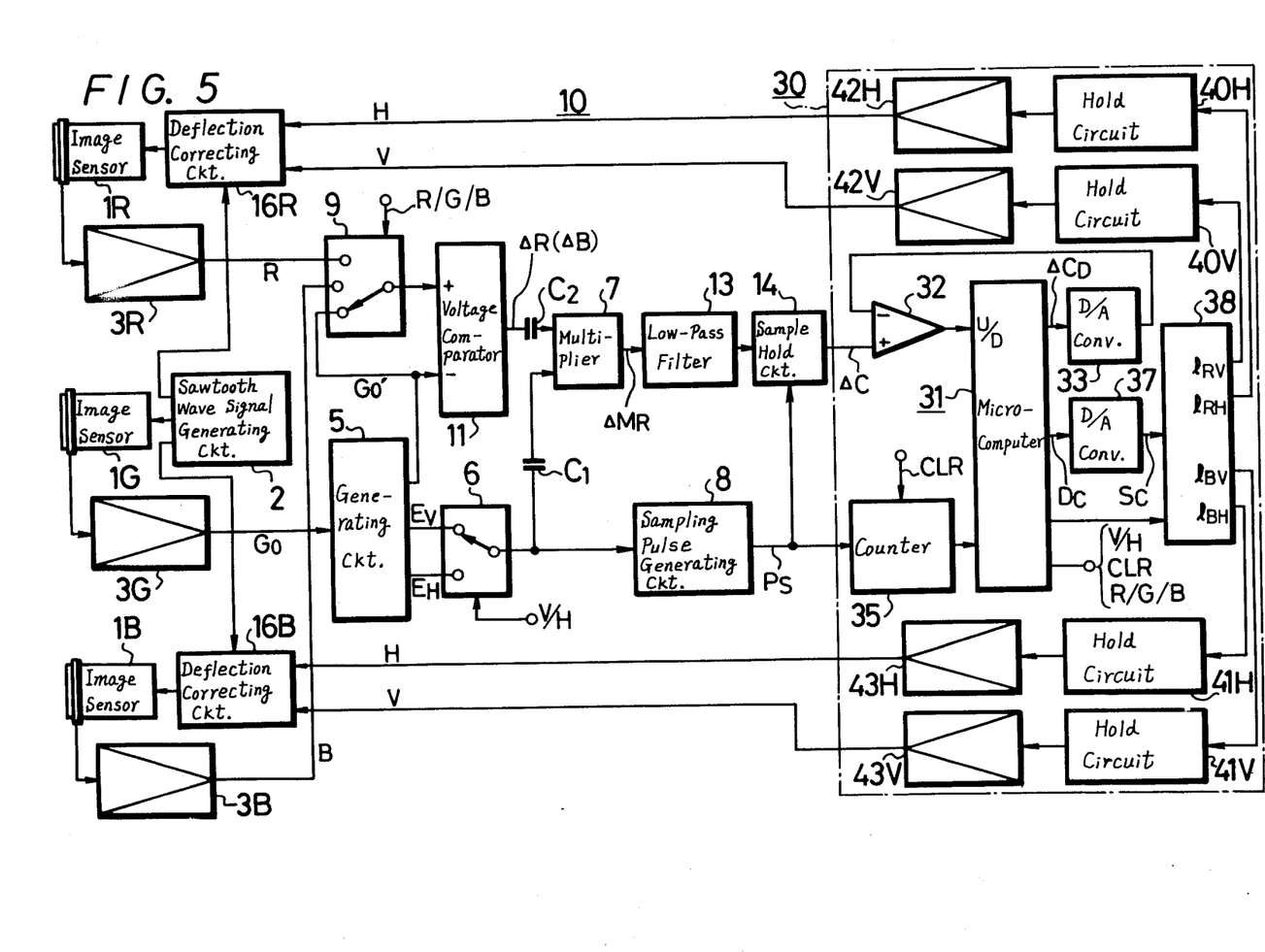
FIG. 5 is a systematic block diagram showing an embodiment of an automatic control circuit for a video camera according to the present invention which is applied to a centering control system.

In FIG. 5, reference numeral 30 designates a correcting signal generating apparatus for generating correcting signals which are fed to the deflection correcting circuits 16R and 16B. The control signals are formed mainly by a microcomputer 31. The held output $\Delta C$ of the sample and hold circuit 14 is A/D-converted by the use of the microcomputer 31. To this end, the microcomputer 31 is provided at its input stage with a voltage comparator 32 to which the held output $\Delta C$ is applied and the computer 31 is also provided at its output stage, at which the digital held output $\Delta C_D$ corresponding to the held output $\Delta C$ is obtained, with a D/A (digital-to-analog) converter 33. The D/A-converted output therefrom is supplied to the voltage comparator 32 and the register of the microcomputer 31 is controlled such that this D/A-converted output becomes coincident with the held output $\Delta C$. Accordingly, the system which includes the voltage comparator 32, the register of the microcomputer 31 and the D/A converter 33 serves as an A/D converting system in which the register of the microcomputer 31 is operated in accordance with the program as a comparing register by each bit in a sequentially comparing type A/D converter.

The sampling pulse $P_S$ corresponding to the number of the edge components of the object existing within the window area $S_W$ is supplied to a counter 35 in which the number of the edge components in the vertical and horizontal directions is counted. This counted number of edge components is supplied to the microcomputer 31 which detects whether the number of edge components necessary for the centering adjustment exist or not. When the number of edge components thus detected is beyond a predetermined number, the microcomputer 31 produces a new control data (a correcting data) which corresponds to the correcting signal. In other cases, an error signal is generated and a control data used prior to the centering adjustment is produced as the control data.

The control data $D_C$ (for example, data of 8 bits) derived from the microcomputer 31 is converted to the form of an analog signal by a D/A converter 37 and distributed to a corresponding control system by a demultiplexer 38. For example, when the control data $D_C$ is the data used to adjust the vertical centering of the red image sensor IR, the analog control signal, namely, the deflection correcting signal $S_C$ is selected to be supplied to a line $l_{RV}$. The selection of lines is carried out on the basis of the command data supplied thereto from the microcomputer 31.

Circuits 40H, 40V, 41H and 41V and circuits 42H, 42V, 43H and 43V respectively connected to lines $l_{RV}$, $l_{RH}$, $l_{BV}$ and $l_{BH}$ are hold circuits and output amplifiers, respectively.

The centering adjusting modes carried out by the microcomputer 31 will hereinafter be described in detail with reference to FIG. 6.

Figure 6:
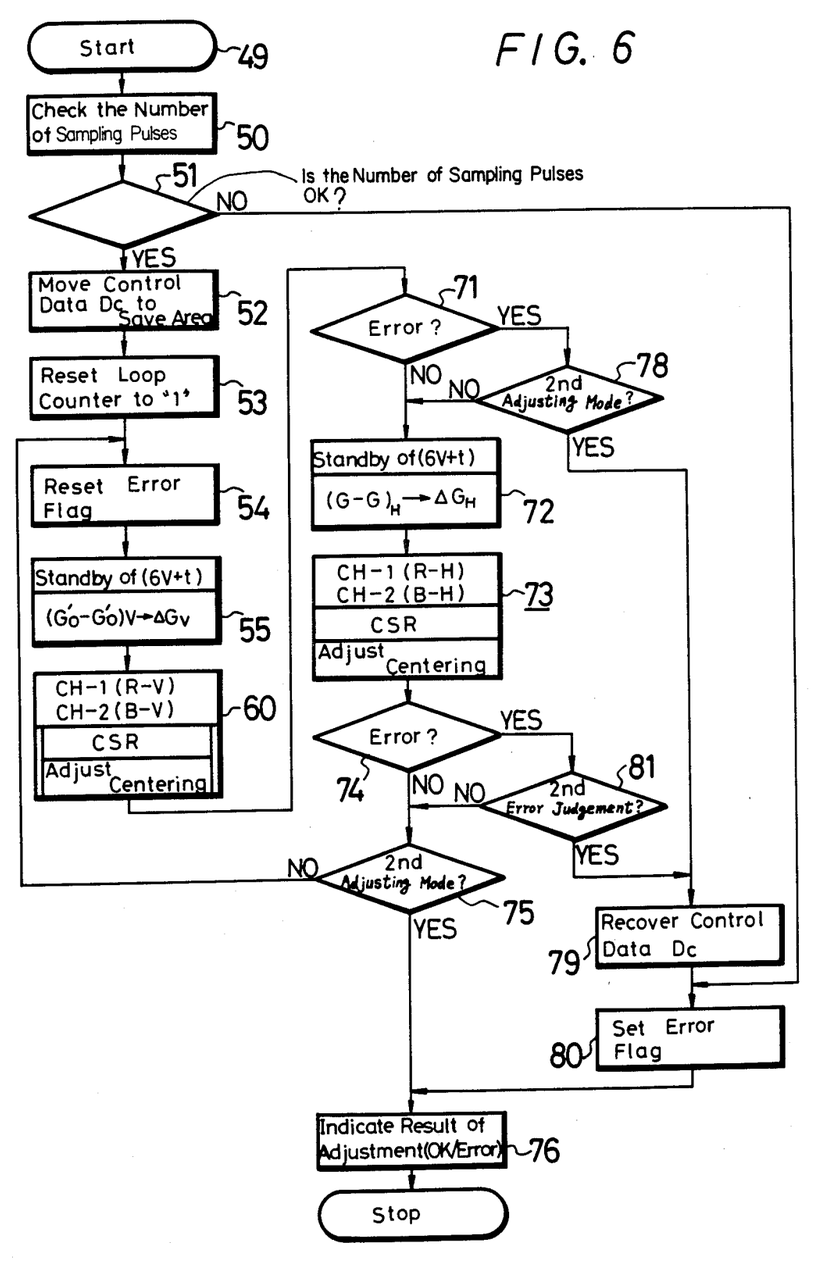
FIGS. 6 to 8 are respectively flow charts useful for explaining an example of the converging method of this invention.

In FIG. 6, the centering adjusting mode begins with the step 49. At the step 50, the number of sampling pulses corresponding to the number of edge components in the horizontal and vertical directions of the object existing within the window area $S_W$ is checked. When the fact that the number of sampling pulses or edge components is beyond the predetermined number is detected (step 51), the control data $D_C$ prior to the centering adjustment is moved to a save area in the step 52. Thereafter, at the step 53, a loop counter is reset to "1" and at the following step 54, an error flag is reset.

At the step 55, after the standby of (6V+t) (where V represents one vertical period and t the vertical scanning time within the window area $S_W$), the vertical reference signal $\Delta G_V$ is detected. This standby time is used to carry out data processing after the transient period is passed. The vertical reference signal $\Delta G_V$ is stored in the memory.

After the vertical reference signal $\Delta G_V$ is stored in the memory, the processing step is moved to a first subroutine 60. This subroutine 60 is used to carry out the adjustment of the vertical centering for the red and blue image sensors 1R and 1B.

At the following step 71, whether the vertical centering adjustment lies within a predetermined converging value or not is detected. Unless the converging value is erroneous, the processing step is advanced to the step 72 wherein, after the standby time of (6V+t), the detection of the horizontal reference signal $\Delta G_H$ is executed for the adjustment of the horizontal centering.

After the horizontal reference signal $\Delta G_H$ is stored in the memory, the processing step is moved to a second subroutine shown by the step 73 in which the adjustment of the horizontal centering for the red and blue image sensors 1R and 1B is executed similarly as before.

After the horizontal centering is adjusted, whether the horizontal deflection correcting signal lies within a predetermined converging value or not is judged at the step 74. When no error exists, whether the adjusting mode is the second adjusting mode or not is judged at the step 75. If the adjusting mode is the first adjusting mode, the processing step is returned to the step 54 and then the similar operation is repeated. When the second adjusting mode is ended, the result of the centering adjustment (satisfactory or erroneous) is indicated at the step 76.

When the error judgement is obtained at the step 71, whether such error judgement is the first error judgement or not is detected at the step 78. When the error judgement is the first error judgement, the processing step is moved to the step 72, while when the error judgement is the second error judgement, the previous control data $D_C$, which was moved to the same area, is recovered at the step 79. This control data $D_C$ is used as each of the horizontal and vertical correcting signals similarly as before. At that time, at the step 80, the error flag is set and the error indication is carried out at the step 76.

Similarly in the horizontal centering adjusting mode, whether the error judgement is the first or second error judgement is detected at the step 81. When the error judgement in step 81 is the second error judgement, the processing step is moved to the step 79 similarly as above.

The number of the automatic adjustments is not limited to twice. The first and second subroutines are different only in that the object to be controlled is either the vertical deflection system or the horizontal deflection system. Therefore, only the first subroutine will be described.

Figure 7:
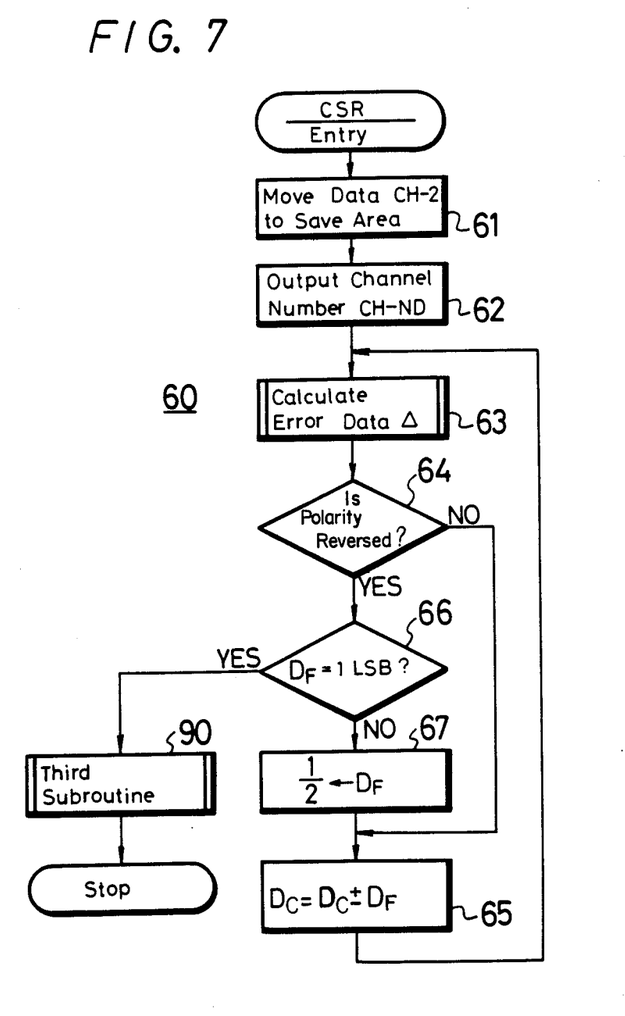

FIG. 7 is a flow chart of an example of a subroutine CSR used for adjusting the vertical centering. When the entry of this subroutine CSR is made, at the step 61, control data (data of a second channel CH-2) regarding the blue image sensor 1B is moved to the save area and the control of a first channel CH-1, for example, of the red image sensor 1R is executed first.

At the step 62, a line selecting signal which selects the lines $l_{RV}$ and $l_{RH}$ corresponding to the channel number CH-NO is supplied to the demultiplexer 38. At the succeeding step 63, the calculation ($\Delta C - \Delta G_V = \Delta$) between the held output $\Delta C$ and the vertical reference data $\Delta G_V$ is executed to calculate an error data $\Delta$. This execution is of a subroutine arrrangement.

At the same time when the error data $\Delta$ is calculated, whether the count mode of the up-down counter to which the held output $\Delta C$ is supplied is the same as the previous count mode (up-mode or down mode), that is, whether there is a polarity reversal, or not is judged at the step 64. When the count mode of the up-down counter is the same as the previous count mode, that is, when there is no polarity reversal the control data $D_C$ is calculated at the step 65.

The initial value of a reference correcting data $D_F$ is selected to be, for example, 1/16 of the maximum correcting amount (00010000 in the case of the data formed of 8 bits). When the error data $\Delta$ calculated at the step 63 is positive, the reference correcting data $D_F$ is subtracted from the control data $D_C$, while when the error data $\Delta$ is negative, the reference correcting data $D_F$ is added to the control data $D_C$. A new control data $D_C$ in which the reference correcting data $D_F$ is added to the control data $D_C$ is used as the correcting signal for the vertical centering adjustment.

Accordingly, the vertical centering is not converged immediately to the predetermined value by the correcting signal. That is, the result corrected by the new control data $D_C$ is calculated again at the step 63 and the same reference correcting data $D_F$ as before is again added to the control data $D_C$ so as to produce a new control data $D_C$. As a result, the error data $\Delta$ is gradually decreased and hence the correction becomes overcorrection at last, thus, the polarity of the error data $\Delta$ is reversed (see FIG. 9).

The reversing of the polarity is judged by step 64 and whether the reference correcting data $D_F$ is 1 LSB (least significant bit) or not is judged at the next step 66. When the reference correcting data $D_F$ is beyond 1 LSB, the reference correcting data $D_F$ is changed to $\frac{1}{2}$ at the step 67. The reference correcting data $D_F$ is decreased to $\frac{1}{2}, \frac{1}{4}, \frac{1}{8} \ldots$ each time the polarity of the error data $\Delta$ is inverted. Accordingly, when the number of the inversions is taken as n, $(1/2^n)D_F$ becomes the reference correcting data $D_F$ at that time.

If such control is sequentially repeated, the error data $\Delta$ is gradually decreased and the reference correcting data $D_F$ becomes 1 LSB finally, which then is detected at the step 66. Then, the control mode is moved to a third subroutine (step 90).

At step 90, the fine adjustment of the vertical centering is carried out and each time the polarity of the error data $\Delta$ is inverted or reversed, the control data $D_C$ is stored. When the polarity has been reversed M times (for example, four to five times), the control mode is stopped and an average value $$\sum_{i=1}^{M} D_{Ci}/M$$

of the accumulated value of the stored control data $D_C$ is used as the final control data $D_C$.

Figure 8:
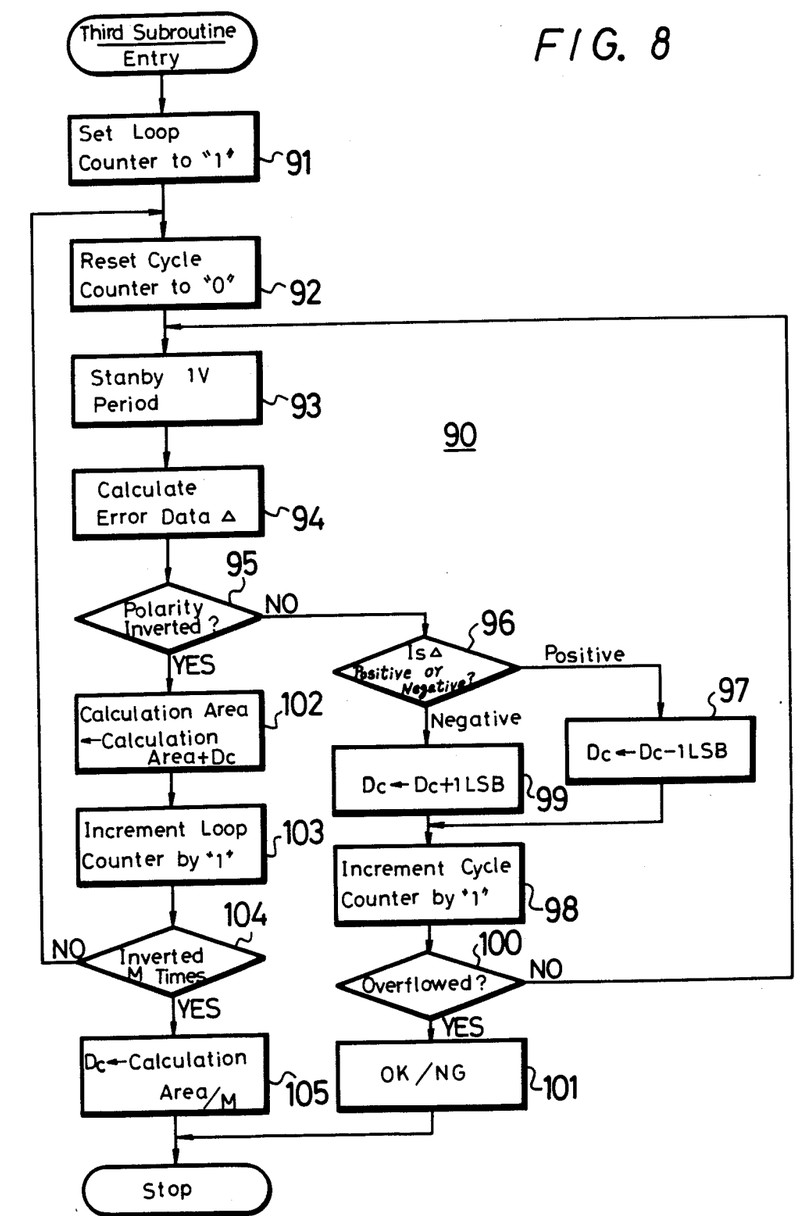

To this end, firstly as shown in FIG. 8, at the step 91, the loop counter used for inverting the polarity is set to "1". At the step 92, the cycle counter for overflow is reset to "0", and at the next step 93, the standby of 1 vertical period (1 V period) is carried out. Thereafter, at the step 94, the error data $\Delta$ is calculated and the polarity inversion of the error data $\Delta$ is detected at the step 95. If the polarity of the error data $\Delta$ is not changed, the mode is moved to the step 96 in which the positive and negative polarity of the error data $\Delta$ are judged. When the condition of $\Delta > 0$ is satisfied, the reference correcting data $D_F$ of 1 LSB is subtracted from the control data $D_C$ at the step 97 to produce a new control data $D_C$ and thereafter, the cycle counter is incremented by "1" at the step 98. When the condition of $\Delta < 0$ is satisfied, the reference correcting data $D_F$ of 1 LSB is added to the control data $D_C$ at the step 99 to produce a new control data $D_C$ and the cycle counter is similarly incremented by "1" at the step 98. Then, in the step 100, when the fact that the count value of the cycle counter is not overflowed is judged, the mode is again returned to the step 93. Thereafter, the centering adjustment is carried out on the basis of the new control data $D_C$ which results from adding to or subtracting from the control data $D_C$ the reference correcting data $D_F$ of 1 LSB.

Accordingly, when the addition and subtraction of the reference correcting data $D_F$ of 1 LSB is carried out several times, the polarity of the error data $\Delta$ is inverted so that when the polarity of the error data $\Delta$ is inverted, the control data $D_C$ at that time is stored in the calculation area at the step 102. Each time the control data $D_C$ is stored in the calculation area, the loop counter is incremented by "1" at the step 103 and until the number of the increments of the loop counter reaches M times, the similar operation is repeated. When the fact that the polarity of the error data $\Delta$ is inverted M times is judged at the step 104, the average value $$\left(\frac{1}{M} \sum_{i=1}^{M} D_{Ci}\right)$$

of the accumulated control data $$\sum_{i=1}^{M} D_{Ci}$$

stored in the calculation area is calculated (at the step 105). The averaged control data is supplied to the corresponding correcting circuits 16R and 16B as the final control data $D_C$, respectively.

The above operation is similarly carried out for the horizontal centering adjustment.

Figure 9:
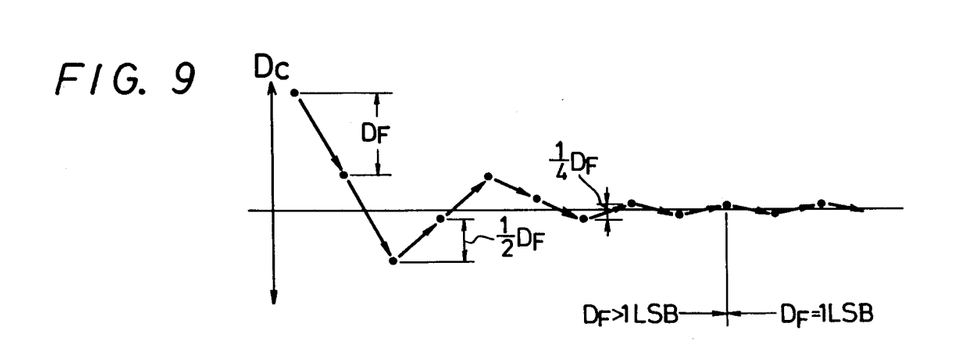
FIG. 9 is a graph showing an example of the converging.

As described above, according to the present invention, the error data $\Delta$ itself is not used for adjusting the vertical and horizontal centering. But instead, as shown in FIG. 9, the signal formed by adding the reference correcting data (initial value) $D_F$ calculated from the detected error data $\Delta$ and to the correcting signal (the control data $D_C$) is used as the correcting signal for adjusting the centering and then, until the polarity of the new error data $\Delta$ resulting from the addition of this correcting signal is inverted, the above reference correcting data $D_F$ is added to the control signal $D_C$ to thereby sequentially correct the same. Each time the polarity of this error data $\Delta$ is inverted, the polarity of the reference correcting data $D_F$ to be added to the control signal $D_C$ is inverted and at the same time, the value of the reference correcting data $D_F$ is changed to $1/2^n$ (n represents the number of polarity inversion) and this reference correcting data $D_F$ is sequentially decreased to thereby converge the control signal $D_C$ to the predetermined value.

According to this converging method of the invention, the overcorrection and insufficient correction are alternately carried out so as to obtain the final control data so that regardless of the number of edge components in the horizontal and vertical directions, accordingly, whether the relation between the displacement of the centering and the control data $D_C$ is presented as shown by the straight line a or b in the graph of FIG. 4 the similar correction can be carried out. As a result, even when the object having less edge components is used, it is possible to converge the control signal $D_C$ to the correct converting value surely.

Figure 10:
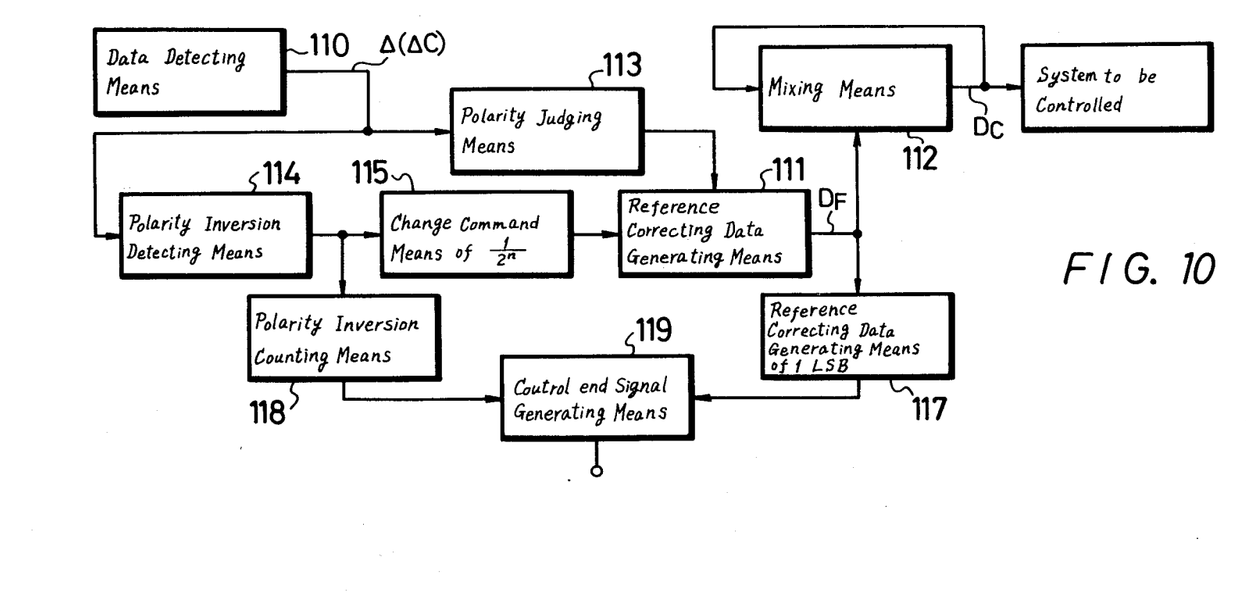
FIG. 10 is a conceptual diagram of the converging method of this invention.

FIG. 10 is a conceptual diagram showing the above converging method of the invention. As shown in FIG. 10, the reference correcting data $D_F$ obtained on the basis of the data $\Delta C$ (accordingly, $\Delta$) produced from a data detecting means 110 and derived from a reference correcting data generating means 111 is mixed with the control data $D_C$ in a mixing means 112 to become the new control data $D_C$. The polarity of the reference correcting data $D_F$ is controlled by the output from the polarity judging means 113 and a change command means 115 is operated by the output from a polarity inversion detecting means 114 whereby the value of the reference correcting data $D_F$ is changed in accordance with the number of polarity inversions.

Then, when the fact that the reference correcting data detecting means 117 of 1 LSB, the number of polarity inversions is counted by a polarity inversion counting means 118. When the number of polarity inversions reaches M times, a control end signal generating means 119 generates the correcting signal by which the converging loop is stopped.

While in the above embodiment, the present invention is applied to the vertical and horizontal centering control system, it is needless to say that this invention can also be applied to the white balance control system.

As set forth above, according to this invention, even when the object having poor control condition is used, the object to be corrected in the controlled system can surely be converged to the predetermined value so that the automatic control accuracy can be increased largely.

Although a single preferred embodiment of the invention has been described above, it will be apparent that the invention is not limited to that precise embodiment, and that many modifications and variations could be effected therein by one skilled in the art without departing from the spirit or scope of the invention as defined by the appended claims.

We claim as our invention:

1. An automatic control circuit for a controlled circuit of a video camera comprising:
    an error detecting circuit for detecting and generating error data;
    control signal generator means supplied with said error data for generating an averaged control signal; and
    a control circuit supplied with said averaged control signal for controlling said controlled circuit in the video camera, said control signal generator means mixes reference correcting data with an interim control signal in a manner determined by said error data thereby to generate a new control signal, and said control signal generator means includes means for changing the polarity of said reference correcting data and decreasing the absolute value of said reference correcting data when said error data changes its polarity, and means for averaging a plurality of the control signals each of which is generated when said reference correcting data is at its minimum value and said error data changes its polarity, the output of said averaging means being said averaged control signal.

2. An automatic control circuit according to claim 1, wherein said means for changing decreases the absolute value of said reference correcting data by one half for each of said changes of the polarity of said error data.

3. An automatic control circuit according to claim 1, wherein said error detecting circuit defines a window within which the error data is detected.

4. An automatic control circuit according to claim 3, wherein said error detecting circuit detects the number of edge components of an object within said window to be picked up by said video camera and generates a flag signal indicating whether said number of edge components of said object is proper for automatic control or not, said flag signal being supplied to said control signal generator means.

5. An automatic control circuit according to claim 1, wherein said error detecting circuit has an analog-to-digital converter for converting the error data to a digital form.

* * * * *